(12) United States Patent
Carson

(10) Patent No.: US 9,834,154 B2
(45) Date of Patent: Dec. 5, 2017

(54) CONCEALABLE AND DEPLOYABLE DASHBOARD CAMERA

(71) Applicant: Bradley C. Carson, Troy, MI (US)

(72) Inventor: Bradley C. Carson, Troy, MI (US)

( * ) Notice: Subject to any disclaimer, the term of this patent is extended or adjusted under 35 U.S.C. 154(b) by 0 days.

(21) Appl. No.: 15/350,553

(22) Filed: Nov. 14, 2016

(65) Prior Publication Data

US 2017/0136963 A1 May 18, 2017

Related U.S. Application Data

(60) Provisional application No. 62/254,420, filed on Nov. 12, 2015.

(51) Int. Cl.
*B60R 11/04* (2006.01)
*G03B 17/56* (2006.01)
*H04N 5/225* (2006.01)
*B60R 11/00* (2006.01)

(52) U.S. Cl.
CPC .............. *B60R 11/04* (2013.01); *B60R 11/00* (2013.01); *G03B 17/561* (2013.01); *H04N 5/2252* (2013.01); *B60R 2011/0005* (2013.01); *B60R 2011/0047* (2013.01); *B60R 2011/0082* (2013.01)

(58) Field of Classification Search
None
See application file for complete search history.

(56) References Cited

U.S. PATENT DOCUMENTS

| | | | | |
|---|---|---|---|---|
| 4,913,458 | A * | 4/1990 | Hamilton | B60S 9/06 212/304 |
| 2005/0014527 | A1 * | 1/2005 | Chambers | H04M 1/0264 455/556.1 |
| 2005/0162545 | A1 * | 7/2005 | Jeon | H04N 5/2252 348/373 |
| 2012/0251092 | A1 * | 10/2012 | Zwaan | B64C 39/024 396/428 |
| 2015/0183302 | A1 * | 7/2015 | Da Deppo | B60R 11/04 49/324 |

* cited by examiner

*Primary Examiner* — W B Perkey
(74) *Attorney, Agent, or Firm* — Dunlap Bennett & Ludwig PLLC

(57) ABSTRACT

A deployable and concealable camera apparatus is provided. The present invention includes a housing a motor, an actuator and a camera. The housing is disposed beneath an automobile fixture, such as a dashboard or vehicle instrument panel. The actuator is driven by the motor. The motor and the actuator move the camera to a deployed state and a retracted state when activated. The deployed state includes the camera extending through an aperture formed in the automobile fixture and extending substantially beyond the automobile fixture. The retracted state includes the camera disposed substantially beneath the automobile fixture.

10 Claims, 4 Drawing Sheets

CONCEALABLE AND DEPLOYABLE DASHBOARD CAMERA

CROSS-REFERENCE TO RELATED APPLICATION

This application claims the benefit of priority of U.S. provisional application No. 62/254,420, filed Nov. 12, 2015, the contents of which are herein incorporated by reference.

BACKGROUND OF THE INVENTION

The present invention relates to dashboard cameras and, more particularly, to a dashboard camera that extends while in use and retracts while not in use.

A dashcam or dashboard camera is an onboard camera that continuously records the view through a vehicle's windscreen. It may be attached to the interior windscreen or to the top of the dashboard, by suction cup or adhesive-tape mount. Dashcams may provide video evidence in the event of an accident.

Cameras are often mounted clumsily on the dashboard, windshield, seats, or mirror of the automobile or on the exterior of the automobile exposed to elements or theft. Standalone devices can be readily seen from outside the vehicle when not in use and can be stolen or fall off their temporary mounts. Further, when camera devices are mounted on the windshield they obstruct the drivers field of vision. When camera devices are mounted on the exterior of the vehicle they are subject to the elements which may adversely affect the performance of the device.

As can be seen, there is a need for an improved apparatus that protects dashboard cameras from the elements and from thieves.

SUMMARY OF THE INVENTION

In one aspect of the present invention, a deployable and concealable camera apparatus comprises: a housing disposed beneath an automobile fixture; a motor; an actuator driven by the motor; a camera supported by the housing and operably connected to the actuator, wherein the motor and the actuator move the camera to a deployed state and a retracted state when activated, the deployed state comprising the camera extending through an aperture formed in the automobile fixture and extending substantially beyond the automobile fixture, the retracted state comprising the camera disposed substantially beneath the automobile fixture.

In another aspect of the present invention, a deployable and concealable camera apparatus comprises: a housing comprising a stationary bracket and a sliding bracket slidably connected to the stationary bracket by a guide rail; a motor secured to the housing; an actuator comprising a worm gear extending from the motor and rotatable by the motor, wherein the worm gear runs through a threaded bushing of the sliding bracket; a camera comprising a pair of feet disposed within substantially vertical slots formed in the stationary bracket and angled slots formed in the sliding bracket, wherein the worm gear is rotated by the motor and the sliding bracket slides along the guide rail so that the pair of feet slide along the substantially vertical slots and the angled slots to a deployed state and a retracted state, the deployed state comprising the pair of feet disposed near a top portion of the substantially vertical slots and the angled slots and the camera extending from a top of the housing; the retracted state comprising the pair of feet disposed near a bottom portion of the substantially vertical slots and the angled slots and the camera disposed substantially within the housing.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a concealable and deployable vehicle interior popup camera and sensor mechanism. The improved camera and sensor device discreetly stows away safely when not in use and conveniently deploys to a usable position for both external and internal vehicle monitoring. When not in use, the present invention is stowed out of sight and not easily accessible for theft. When use is desired the camera and/or sensor are easily deployed moving from beneath the vehicle instrument panel to a position above the instrument panel surface.

In certain embodiments, the camera/sensor device may be integrated into the vehicle's on board computer and information/entertainment system to record and display real-time action inside and outside the vehicle that can be shared with others. The device also capture video for viewing on connected devices, such as monitors or screens of the automobile and handheld devices. Additionally, the device acquires data from merchant signals, traffic signals, passenger presence and actions, and other signals and/or devices by the devices camera and/or sensor(s) to aid the vehicle and occupants in autonomous driving, entertainment, and information needs and desires.

Figure 1:
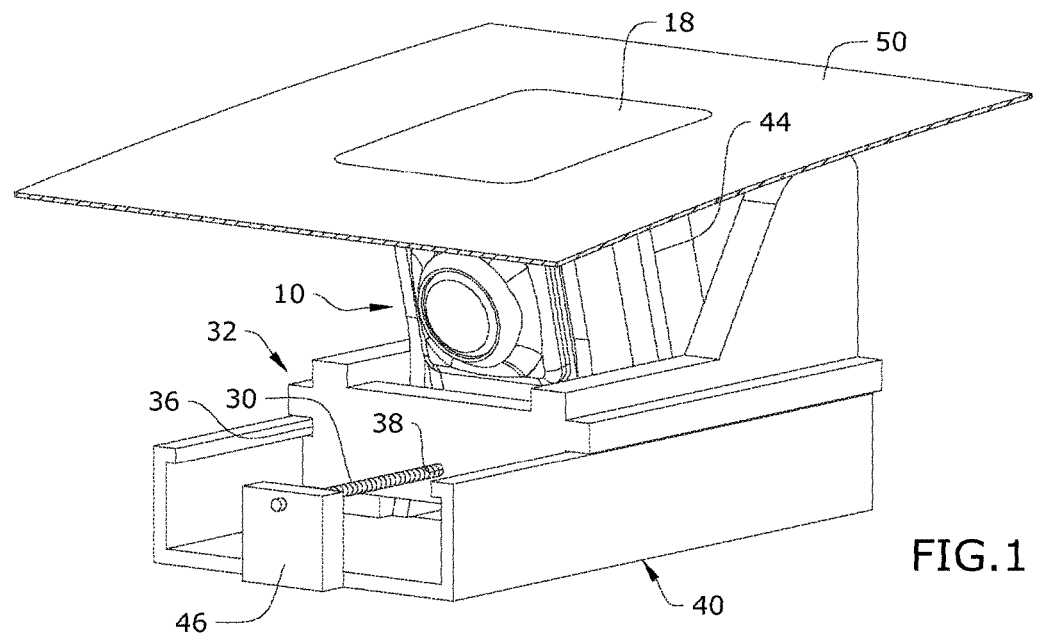
FIG. 1 is a perspective view of an embodiment of the present invention shown in use in a retracted state.
Figure 2:
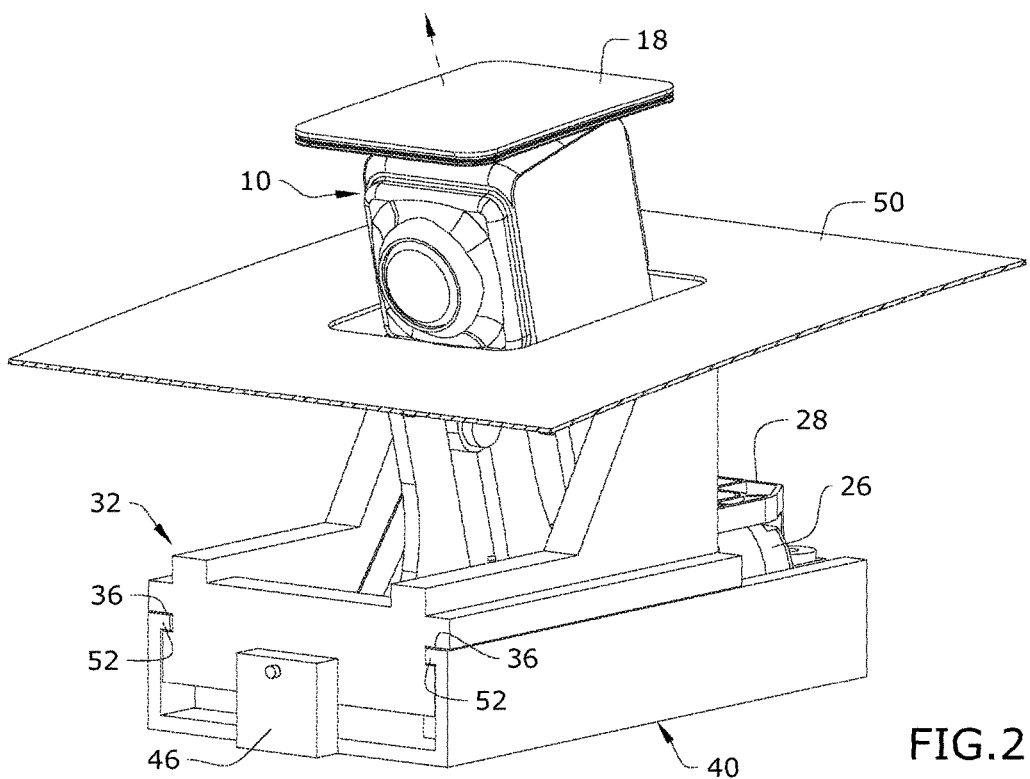
FIG. 2 is a perspective view of an embodiment of the present invention shown in use in an extended state.
Figure 3:
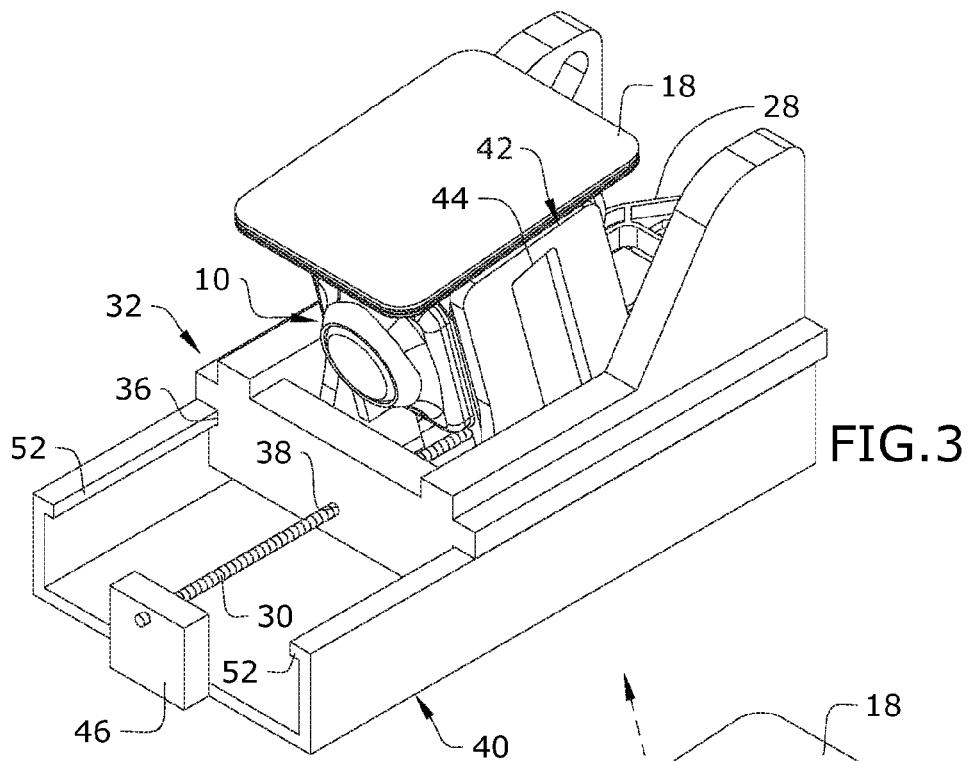
FIG. 3 is a perspective view of an embodiment of the present invention in a retracted state.
Figure 4:
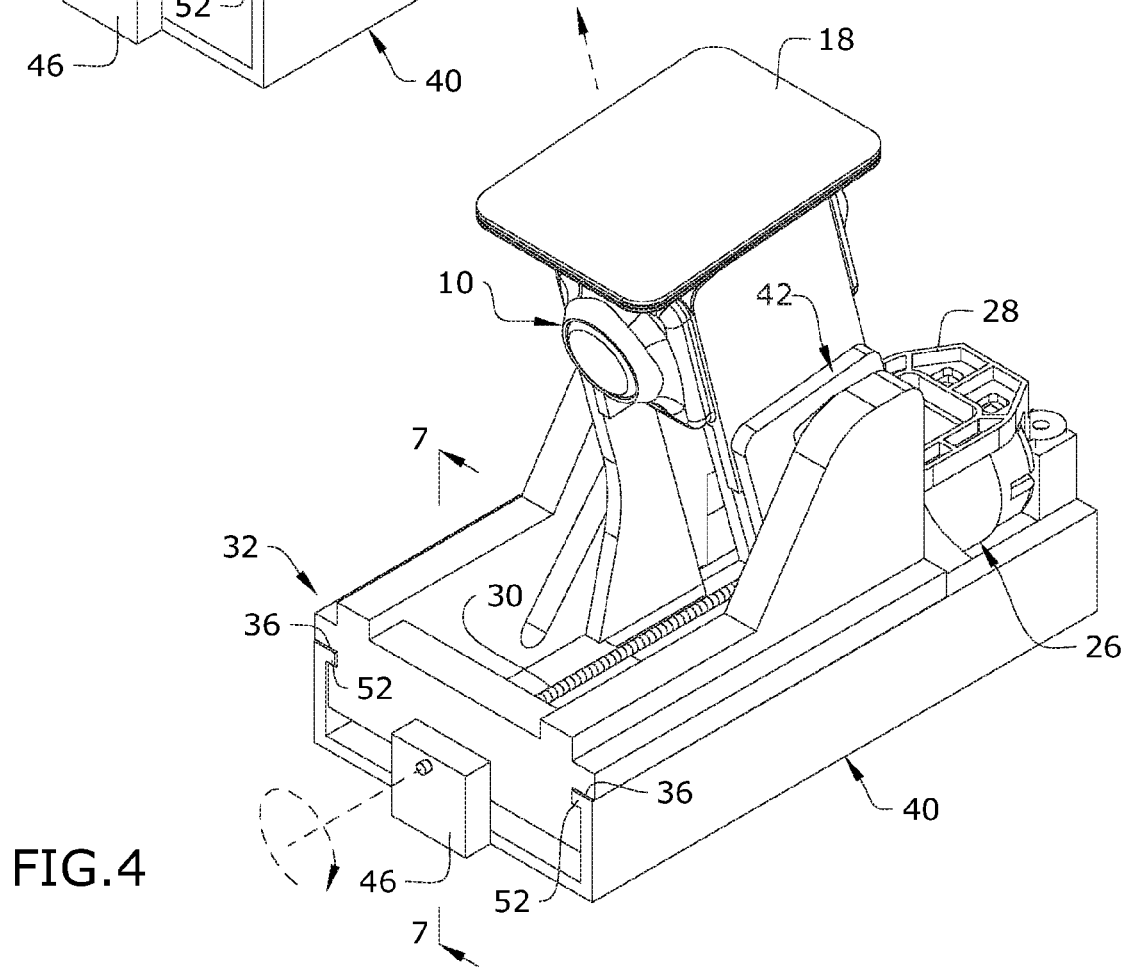
FIG. 4 is a perspective view of an embodiment of the present invention in an extended state.
Figure 5:
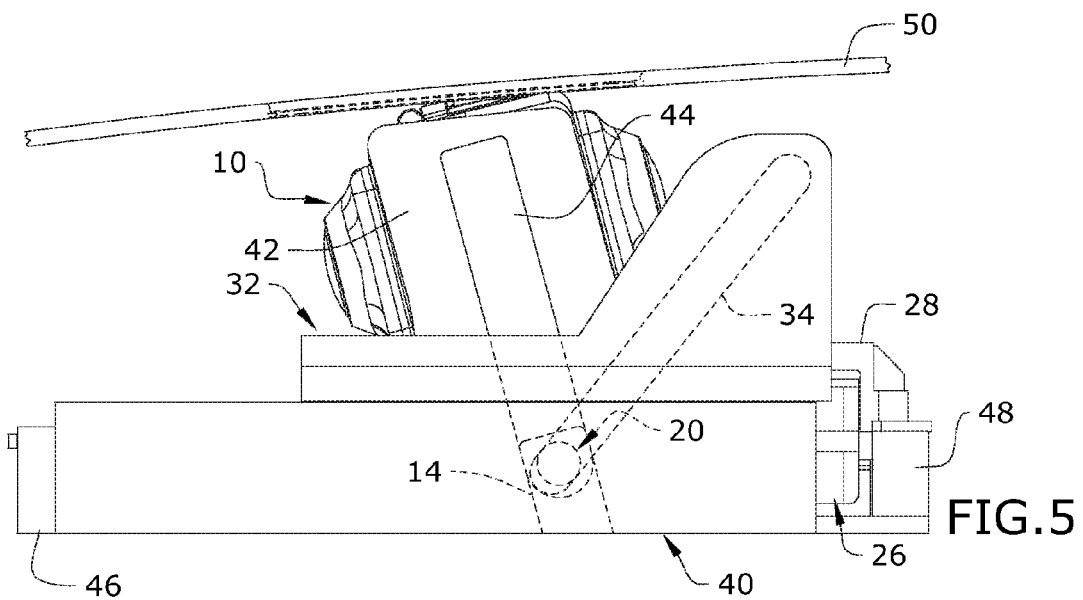
FIG. 5 is a side view of an embodiment of the present invention shown in a retracted state.
Figure 6:
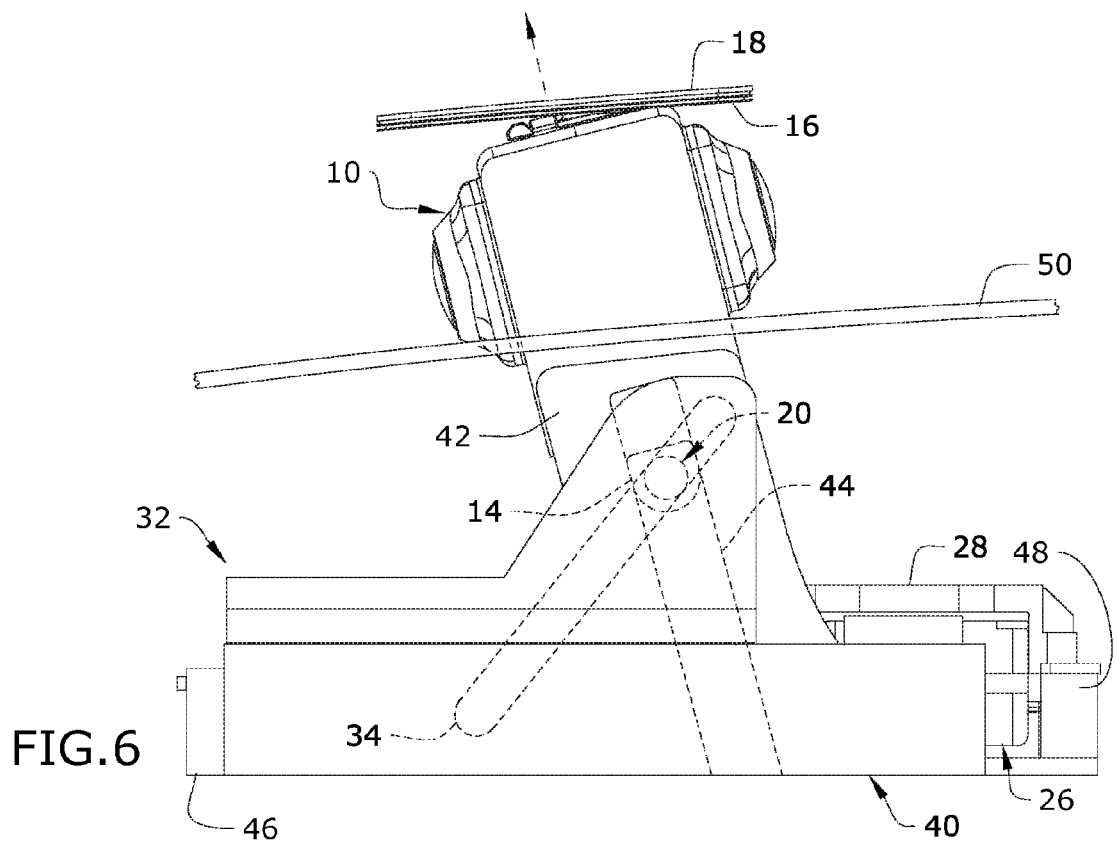
FIG. 6 is a side view of an embodiment of the present invention shown in an extended state.
Figure 7:
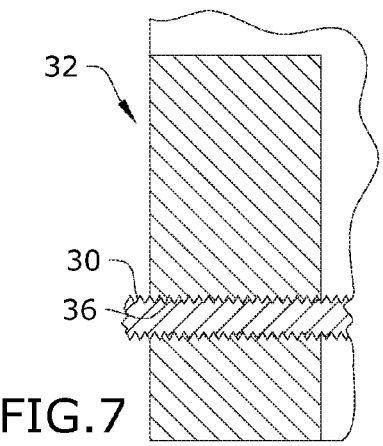
FIG. 7 is a section detail view taken along ling 7-7 in FIG. 4.
Figure 8:
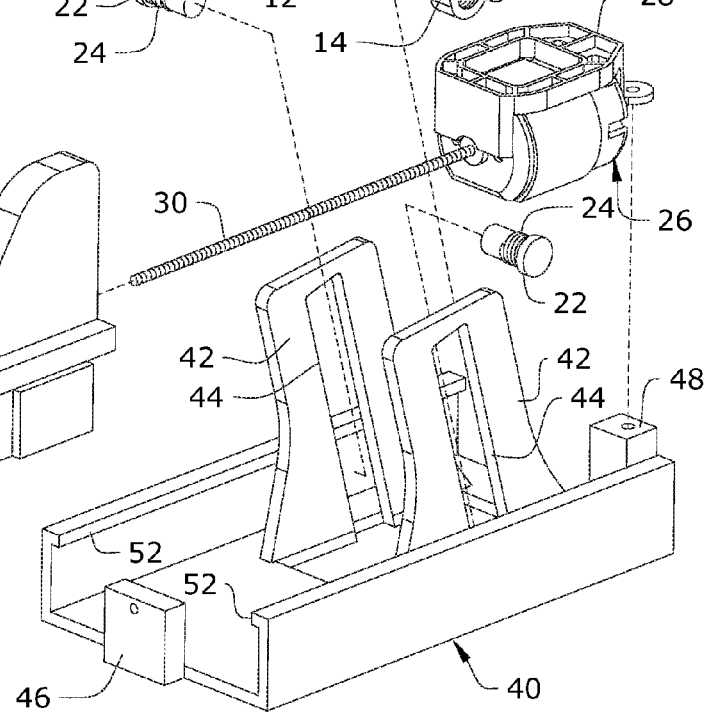
FIG. 8 is an exploded view of an embodiment of the present invention.

Referring to FIGS. 1 through 8, the present invention includes a deployable and concealable camera apparatus. The present invention includes a housing 32, 40, a motor 26, an actuator 30 and a camera 10. The housing 32, 40 is disposed beneath an automobile fixture 50, such as a dashboard or vehicle instrument panel. The actuator 30 is driven by the motor 26. The motor 26 and the actuator 30 move the camera 10 to a deployed state and a retracted state when activated. The deployed state includes the camera 10 extending through an aperture formed in the automobile fixture 50 and extending substantially beyond the automobile fixture 50. The retracted state includes the camera disposed substantially beneath the automobile fixture 50.

In certain embodiments, the present invention may include a cover 18 secured to the top end of the camera 10 and a gasket 16 secured to the automobile fixture 50. In the retracted state, the cover 18 may be flush with the automobile fixture 50. For example, the cover 18 and the gasket 16 may be disposed in between an inner edge of the aperture of the automobile fixture 50 in the retracted state. Therefore, when the camera 10 is not use, the camera 10 is not visible.

The housing 32, 40 of the present invention may include a stationary bracket 40 and a sliding bracket 32. The stationary bracket 40 may be fixed to the automobile below the automobile fixture 50. The sliding bracket 32 may be connected and slidably engaged with the stationary bracket 40 along a guide rail 52, 36. In certain embodiments, the guide rail 52, 36 may include extending rails 52 protruding from the stationary bracket 40 and slots 36 formed along the sliding bracket 32. The rails 52 fit within the slots 36 and the slots 36 slide along the rails 52.

The motor 26 of the present invention may be secured to the housing 32, 40 or alternatively may be secured to the automobile adjacent the housing 32, 40. In certain embodiments, the motor 26 may include a motor mount 28. The stationary bracket 40 may include a motor mount post 48. The motor mount 28 may secure to the motor mount post 48 via a bolt (not illustrated). Therefore, the motor 26 is secured to the stationary bracket 40 of the housing 32, 40.

In certain embodiments, the actuator 30 is a worm gear. The worm gear includes screw threads. The motor 26 rotates the worm gear along a central axis of the worm gear. The worm gear may run through a threaded bushing 38 of the sliding bracket 32. An end of the worm gear may rest within a non-threaded aperture of the bracket block 46 of the stationary bracket 40 to keep the worm gear aligned. When the motor 26 rotates the worm gear, the worm gear spins freely within the aperture of the bracket block 46 and engages the internal threads of the threaded bushing 38, thereby sliding the sliding bracket 32 along the guide rails 52, 36 from a first end to a second end of the stationary bracket 40.

The stationary bracket 40 may include vertically extending arms 42 and the sliding bracket 32 may include vertically extending arms. Substantially vertical slots 44 may be formed in the vertically extending arms of the stationary bracket 40 and angled slots 34 may be formed in the vertically extending arms of the sliding bracket 32. In certain embodiments, the substantially vertical slots 44 may be slightly angled towards the angled slots 34. The camera 10 of the present invention may include feet 14 disposed within the angled slots 34 and the substantially vertical slots 44. The feet 14 may each include a threaded bushing 12. A pin 20 includes a shaft 24 having threads mechanically fastened to the threaded bushing 12. The pin 20 further includes a head 22. The feet 14 may be disposed within the substantially vertical slots 44 and the heads 22 of the pins 20 may be disposed within the angled slots 34.

In use, the camera 10 may start in a retracted state. The motor 26 is powered to convert the camera 10 to an extended state. The motor 26 rotates the worm gear, which begins to slide the sliding bracket 32 from a first end of the stationary bracket 40 to a second end of the stationary bracket 40. As the sliding bracket 32 is moved from the first end to the second end, the angled slots 34 guide the feet 14 of the camera from a bottom end of the vertical slots 44 upward to a top end of the vertical slots 44, which in turn guides the camera 10 upward and through the aperture formed in the automobile fixture 50. When the camera 10 is in use, the camera 10 is locked in the extended state. When the camera 10 is turned off, the motor 26 is powered to convert the camera 10 to the retracted state. The motor 26 rotates the worm gear in the opposite direction, which begins to slide the sliding bracket 32 from a second end of the stationary bracket 40 to a first end of the stationary bracket 40. As the sliding bracket 32 is moved from the second end to the first end, the angled slots 34 guide the feet 14 of the camera 10 from a top end of the vertical slots 44 downwards to a bottom end of the vertical slots 44, which in turn guides the camera 10 downward and back into the aperture formed in the automobile fixture 50. Once the camera 10 is brought back below the aperture, the cover 18 is flush with the automobile fixture 50.

It should be understood, of course, that the foregoing relates to exemplary embodiments of the invention and that modifications may be made without departing from the spirit and scope of the invention as set forth in the following claims.

What is claimed is:

1. A deployable and concealable camera apparatus comprising:
   a housing disposed beneath an automobile fixture;
   a motor;
   an actuator driven by the motor;
   a camera supported by the housing and operably connected to the actuator; and
   a cover secured to a top end of the camera, wherein
   the motor and the actuator move the camera to a deployed state and a retracted state when activated,
   the deployed state comprising the camera extending through an aperture formed in the automobile fixture and extending substantially beyond the automobile fixture,
   the retracted state comprising the camera disposed substantially beneath the automobile fixture and the cover disposed in between an inner edge of the aperture of the automobile fixture.

2. The apparatus of claim 1, wherein the actuator is a worm gear rotated by the motor.

3. The apparatus of claim 2, wherein the housing comprises a stationary bracket and a sliding bracket slidably engaged with the stationary bracket along a guide rail.

4. The apparatus of claim 3, wherein the sliding bracket comprises a threaded bushing, wherein the worm gear runs through the threaded bushing, wherein the worm gear slides the sliding bracket along the guide rail when rotated by the motor.

5. The apparatus of claim 4, wherein the sliding bracket comprises a pair of angled slots and the stationary bracket comprises a pair of substantially vertical slots.

6. The apparatus of claim 5, wherein the camera comprises a bottom portion comprising feet, wherein the feet are disposed within the angled slots and the substantially vertical slots.

7. The apparatus of claim 6, wherein each of the feet comprise a threaded bushing disposed within one of the substantially vertical slot and a threaded pin mechanically fastened to the threaded bushing, wherein the threaded pin is disposed within one of the angled slots.

8. A deployable and concealable camera apparatus comprising:

a housing comprising a stationary bracket and a sliding bracket slidably connected to the stationary bracket by a guide rail;

a motor secured to the housing;

an actuator comprising a worm gear extending from the motor and rotatable by the motor, wherein the worm gear runs through a threaded bushing of the sliding bracket;

a camera comprising a pair of feet disposed within substantially vertical slots formed in the stationary bracket and angled slots formed in the sliding bracket, wherein the worm gear is rotated by the motor and the sliding bracket slides along the guide rail so that the pair of feet slide along the substantially vertical slots and the angled slots to a deployed state and a retracted state, the deployed state comprising the pair of feet disposed near a top portion of the substantially vertical slots and the angled slots and the camera extending from a top of the housing;

the retracted state comprising the pair of feet disposed near a bottom portion of the substantially vertical slots and the angled slots and the camera disposed substantially within the housing.

9. The apparatus of claim 8, wherein each of the feet comprise a threaded bushing disposed within one of the substantially vertical slot and a threaded pin mechanically fastened to the threaded bushing, wherein the threaded pin is disposed within one of the angled slots.

10. A deployable and concealable camera apparatus comprising:

a housing disposed beneath an automobile fixture, the housing comprising a stationary bracket and a sliding bracket slidably engaged with the stationary bracket along a guide rail;

a motor;

an actuator comprising a worm gear rotated by the motor and operably connected to the sliding bracket;

a camera operably connected to the sliding bracket, wherein the motor and the actuator move the camera to a deployed state and a retracted state when activated, the deployed state comprising the camera extending through an aperture formed in the automobile fixture and extending substantially beyond the automobile fixture, the retracted state comprising the camera disposed substantially beneath the automobile fixture.

* * * * *